United States Patent
Rhodes, Jr.

(10) Patent No.: US 6,203,105 B1
(45) Date of Patent: Mar. 20, 2001

(54) VEHICLE IMPACT RESPONSIVE MULTIPLE BLADDER SEATING AND HEADREST SYSTEM AND METHOD

(75) Inventor: Richard D. Rhodes, Jr., Somersworth, NH (US)

(73) Assignee: McCord Winn Textron Inc., Manchester, NH (US)

( * ) Notice: Subject to any disclaimer, the term of this patent is extended or adjusted under 35 U.S.C. 154(b) by 0 days.

(21) Appl. No.: 09/378,380

(22) Filed: Aug. 20, 1999

(51) Int. Cl.$^7$ ........................................ A47C 4/54
(52) U.S. Cl. ........................ 297/284.6; 297/284.1
(58) Field of Search ................ 297/284.1, 284.9, 297/284.4, 284.6

(56) References Cited

U.S. PATENT DOCUMENTS

| | | |
|---|---|---|
| 4,634,083 | 1/1987 | McKinnon . |
| 4,634,179 * | 1/1987 | Hashimoto et al. .............. 297/284.6 |
| 4,655,505 * | 4/1987 | Kashiwamura et al. .......... 297/284.6 |
| 4,707,027 | 11/1987 | Horvath . |
| 4,720,124 | 1/1988 | Mawbey et al. . |
| 4,720,146 | 1/1988 | Mawbey . |
| 4,722,550 | 2/1988 | Imaoka . |
| 4,807,931 | 2/1989 | Ishida . |
| 4,833,614 | 5/1989 | Saitoh . |
| 4,840,425 * | 6/1989 | Noble ................................ 297/284.1 |
| 4,915,124 | 4/1990 | Sember . |
| 5,129,704 * | 7/1992 | Kishi et al. ....................... 297/284.1 |
| 5,135,282 | 8/1992 | Pappers . |
| 5,137,329 | 8/1992 | Neale . |
| 5,263,765 * | 11/1993 | Nagashima et al. .............. 297/284.6 |
| 5,320,409 * | 6/1994 | Katoh et al. ...................... 297/284.6 |
| 5,427,331 | 6/1995 | Stroud . |
| 5,558,398 | 9/1996 | Santos . |
| 5,707,109 | 1/1998 | Massara . |
| 5,772,281 | 6/1998 | Massara . |
| 6,037,731 * | 3/2000 | Fruehauf et al. ............. 297/284.1 X |

* cited by examiner

Primary Examiner—Peter M. Cuomo
Assistant Examiner—Stephen Vu
(74) Attorney, Agent, or Firm—Reising, Ethington, Barnes, Kisselle, Learman & McCulloch PC

(57) ABSTRACT

A system of inflatable air cells (3,10) is constructed and installed in a seat (2) at locations that are strategic to the comfort of the user. The air cells are selectively pressurized to a desired comfort level and in addition, in response to a vehicle impact, are controlled by valves (62, 80) to have a occupant impact protection pressure therein for protecting the occupant against impact with the vehicle seat.

14 Claims, 3 Drawing Sheets

VEHICLE IMPACT RESPONSIVE MULTIPLE BLADDER SEATING AND HEADREST SYSTEM AND METHOD

FIELD OF THE INVENTION

This invention relates to vehicle seating with inflatable air cells for controlling the contour of the seat to enhance comfort and more particularly to such seats having an array of air cells in the seat back.

BACKGROUND OF THE INVENTION

Inflatable air cells have been used in a variety of configurations to provide adjustments to the contour of a seat and in this manner enhance the comfort of the individual using the seat. This is especially important in automobiles where long periods of driving can cause pain and distraction or in other seating applications where individuals are sedentary for long periods of time.

The seating system described in U.S. Pat. No. 4,915,124 involves a simple system of multiple air cells in which each cell is connected through a valve to a source of pressurized air in a manner which allows for simultaneous inflation or deflation of the cells in response to a manually operated switch.

Another air cell inflation system is shown in U.S. Pat. No. 5,263,765. This device inflates the air cells according to two predetermined modes, through tubes individually controlled by valves which are in turn controlled by a microcomputer. The microcomputer is responsive to the fatigue of the driver as represented by seat belt displacement.

The air cells of U.S. Pat. No. 4,722,550 are adjusted in response to engine speed or steering angle and allows for selective inflation between two zones of air cells, one at the sides and one for the bottom and back of the seat. One valve controls each of the zones and is actuated by a microcomputer which receives sensed signals relative to the operating parameters of the automobile.

A manually operated power control system for a lumbar cushion is described in U.S. Pat. No. 4,707,027. A complex seating mechanism is devised to allow the operator to inflate and deflate the cushion while sensing pressure in the cushion to limit actuation of the system to prevent damage thereto.

U.S. Pat. No. 4,833,614 shows a system by which an air cell can be inflated to a selected pressure by sensing the actual pressure, comparing it to the pressure selected and then adjusting the air supply to inflate or deflate the air cell to the selected pressure. In this case the microcomputer converts the pressure signal it receives to a time based signal relative to the period necessary to run the pump to obtain the selected pressure. The pressure is sensed directly from sensors within the air support.

The above systems are limited either to narrow preset operational boundaries if responsive to vehicle operation or occupant movement or rely on the operator to provide a manual interactive response. Although each attempts to improve the comfort of the user and adjust in some manner to the variety of shapes and sizes of the user, each falls short because of the inherent limitations in the particular system.

In addition to inflatable air cells that have been used as a means to actuate adjustment mechanisms for altering the contour of a seat for many years, other adjustment is desirable to customize the seat contour to a particular user. In applications such as automobile seating where fatigue may become a factor, it is of particular interest to provide adjustment from user to user and during use by an individual. Air cells have also been used to adjust the tactile support for such critical regions as the lumbar portion of the back that is particularly susceptible to fatigue. In this instance the air cell provides direct support and not just an adjustment mechanism.

An air cell adjustment mechanism of such tactile support systems is shown in U.S. Pat. No. 5,137,329. This patent describes a support structure consisting of front and back plates between which are sandwiched two air cells. The air cells may be selectively inflated and deflated to provide pivoting adjustment motion to the front plate that provides the support contour for the seat back.

Tactile adjustment is provided by the air cell of U.S. Pat. No. 4,807,931 which is also mounted in a seat to provide the support contour for directly engaging the lumbar region of the user's back.

In addition to the aforesaid systems other vehicle seating systems having included an array of air cells in the seat back or as part of the head rest with the air cells being selectively inflated to control the contour of these parts of the seating system for comfort considerations. Examples of such systems are shown in U.S. Pat. Nos. 4,720,146; 4,840,425; 5,135,282; 5,558,398 and 5,772,281.

In addition to the aforesaid vehicle seating systems it is known in the prior art to provide acceleration responsive inflatable air cells to aid in positioning a seat occupant within the seat structure. One example of such an arrangement is shown in U.S. Pat. No. 4,634,083 wherein an acceleration signal will control an air cell array in a helicopter seat to isolate the occupant from helicopter vibrations. U.S. Pat. No. 5,427,331 discloses an aircraft ejection system that upon sensing ejection will rapidly deflate a pneumatic cushion to assure that the occupant is seated against a firm seat surface as the rapid acceleration of seat against occupant occurs so as to avoid spinal injury. U.S. Pat. No. 5,707,109 discloses a vehicle seat that has inflatable side bolsters that are inflated in response to lateral vehicle acceleration to provide additional occupant side support during vehicle turns.

While suitable for their intended purpose, the various known vehicle seat systems with inflatable air cells for contour shaping of the vehicle seat surface to enhance comfort do not provide for air cell pressure control in response to vehicle impact that can cause the occupant to slam against a seat back and head rest structure following vehicle impact. In seating structures without air cells, such movement can cause the occupant to be in contact with hard seating structure or the hard mechanical components of metallic lumbar support systems.

SUMMARY OF THE INVENTION

A system of inflatable air cells is constructed and installed in a seat at locations that are strategic to the comfort of the user and furthermore to provide a pneumatic barrier or cushion that protects an occupant against contact with hard seating or lumbar adjustment components.

In one working embodiment, such pneumatic barrier or cushion is provided by air cells that are connected to a pump through a manifold that simultaneously or sequentially, as desired, connects each cell to the pump. The manifold controls the flow of fluid in the air cell distribution system by means of a system of valves and senses the pressure in each cell by means of one or more transducers. A microcomputer's non-volatile memory is programmed with data representing a desired comfort level for each of the air cells. By sequentially activating individual manifold valves, a pressure signal from the transducer can be generated for each cell. The pressure signals are received by the microcomputer and are compared with the predetermined comfort data to generate a control signal that activates the pump or opens the exhaust valve. In a preferred embodiment, proportional control is used to regulate pressure in any air zone. The cells can be individually inflated or deflated to the desired pressure level. By varying the number and location of the cells the system becomes responsive to the localized pressures exerted on the body for a great variety of uses. Additionally, in accordance with the present invention, air cells forming the contouring elements of the seat back and a head rest surface have their pressure controlled in response to vehicle impact to cushion occupant contact with hard seating or lumbar adjustment mechanisms following either rear or frontal vehicle impacts.

One purpose of this invention is to provide a pneumatically controlled back seat surface for a vehicle having an array of air cells, each connected to a source of pressurized fluid (air), and arranged in a manner to, in response to vehicle impact, provide a pressurized air cell or air cells in the seat that will cushion and thereby provide head and back impact protection.

In another aspect of the invention either prior inflated air cells in the seat back or head rest of a vehicle seat or air cells either as prior inflated or inflated in response to vehicle impact are controlled to serve as cushions for controlling back or head contact with the air cells in the seat back or head rest as a result of vehicle impact induced movements of a seat occupant.

Another feature of the present invention is to provide a microcomputer in the aforesaid systems in which an initial occupant assessment is made and inputted to the microcomputer and utilized to adjust the vertical height positions of air cells in a head rest of the system to conform to the occupant assessment prior to vehicle impact.

Still another object is to provide an impact protection system in a seat back or head rest by providing air cells therein fully or in part inflated in response to vehicle impact and wherein one or more of the air cells is simultaneously connected through an exhaust orifice that will be opened upon vehicle impact that will deploy an air bag system and wherein air flow through the exhaust orifice dissipates energy/absorb energy of occupant contact with air cells within the seat back and or head rest of the vehicle seat.

Another purpose of this invention is to provide a pneumatically controlled head rest having one or more air cells of an inflation system which can adjust the pressure in each of the cells simultaneously or sequentially, as desired, in accordance with sensed vehicle impact so that the head rest air cells are operatively controlled to individually inflate to a desired pressure level upon vehicle impact or crash to define a head support cushion within a vehicle seat that will be configured to protect and cushion the head of an occupant.

An additional object is to provide the head rest system of the preceding object wherein one or more of the air cells are operatively connected to a bleed orifice for controlling the release of air from the air cells upon contact thereof with an occupant's head so as to dissipates energy/absorb energy of occupant contact with air cells within the seat back and or head rest of the vehicle seat.

Furthermore, another object is to provide such a seat back air cell array or head rest air cells array that will provide desired energy absorption following a vehicle crash while arranged in a manner which minimizes weight, cost, and complexity while maximizing flexibility, reliability, and above all seating safety.

One feature of the present invention is to provide the system of the preceding objects wherein a microcomputer control is provided for seat back or head rest air cell inflation or deflation of the pressure in one or more of the cells to provide energy absorption in response to a vehicle crash during deployment of an air bag impact restraint system.

Another feature of the present invention is to provide a control system for such pneumatically controlled energy absorbing seat back or head rest systems a single vehicle impact sensor and a microcomputer that is programmed to automatically fill an air cell to a predetermined post crash pressure level so as to provide secondary impact pressure changes in response to occupant movement against the seat back or head rest air cells while inflating an air bag restraint system.

Yet another feature of the present invention is to provide a sensor and microcomputer as set forth above that is operative in response to multiple input signals including one or more of an occupant detection condition; a temperature condition; system power-up; on-off switch and a system override switch.

Still another feature of the present invention is to provide a microcomputer in the aforesaid systems in which the controller is programmed to operate multiple valves and a pump to conduct an initial inflate of the system cells to a gross pressure level with all of the valves initially open followed by continuous pressure reads and a sequential closure of each pressure zone formed by one or more cells as the pressure therein is compared by operation of the microcomputer to a desired target pressure and to provide a secondary adjustment of the desired target pressure in response to a vehicle impact signal followed by further adjustment of the pressure zones in at least system air cells in the seat back and in a seat head rest.

A further object of the present invention is to provide a microcomputer control of the preceding object wherein the sequential control of each cell is either by a pressure pump inflation; by an exhaust valve deflation or by an orifice controlled dissipation of energy from the seat back and seat head rest air cells of the system.

Still another feature of the present invention is to provide a microcomputer in the aforesaid systems that conditions the system to open all the cells to atmosphere when a seat is not occupied and to inflate the seat back and head rest air cells of the system to an impact pressure control level in response to vehicle impact.

Still another feature of the present invention is to provide a microcomputer in the aforesaid systems in which an initial occupant assessment is made and inputted to the microcomputer and utilized to establish the energy absorption target pressures for the seat back air cells and the head rest air cells in a look-up table for use in the comfort control operation of the system.

Still another feature of the present invention is to provide a microcomputer in the aforesaid systems in which an initial occupant assessment is made and inputted to the microcomputer and utilized to provide actuation of a height adjustment mechanism to establish a vertical height of the head rest of the system for head impact protection prior to a vehicle impact.

Yet another feature of the present invention is to provide a system having pressure controlled air cells in a head rest of a vehicle seat having fore and aft adjustment of an inflatable energy absorbing air cell that will cushion and/or be associated with a bleed orifice system in response to vehicle impact and upon contact of an occupant's head with the energy absorbing air cell.

DESCRIPTION OF THE PREFERRED EMBODIMENTS

The Seat

Figure 1:
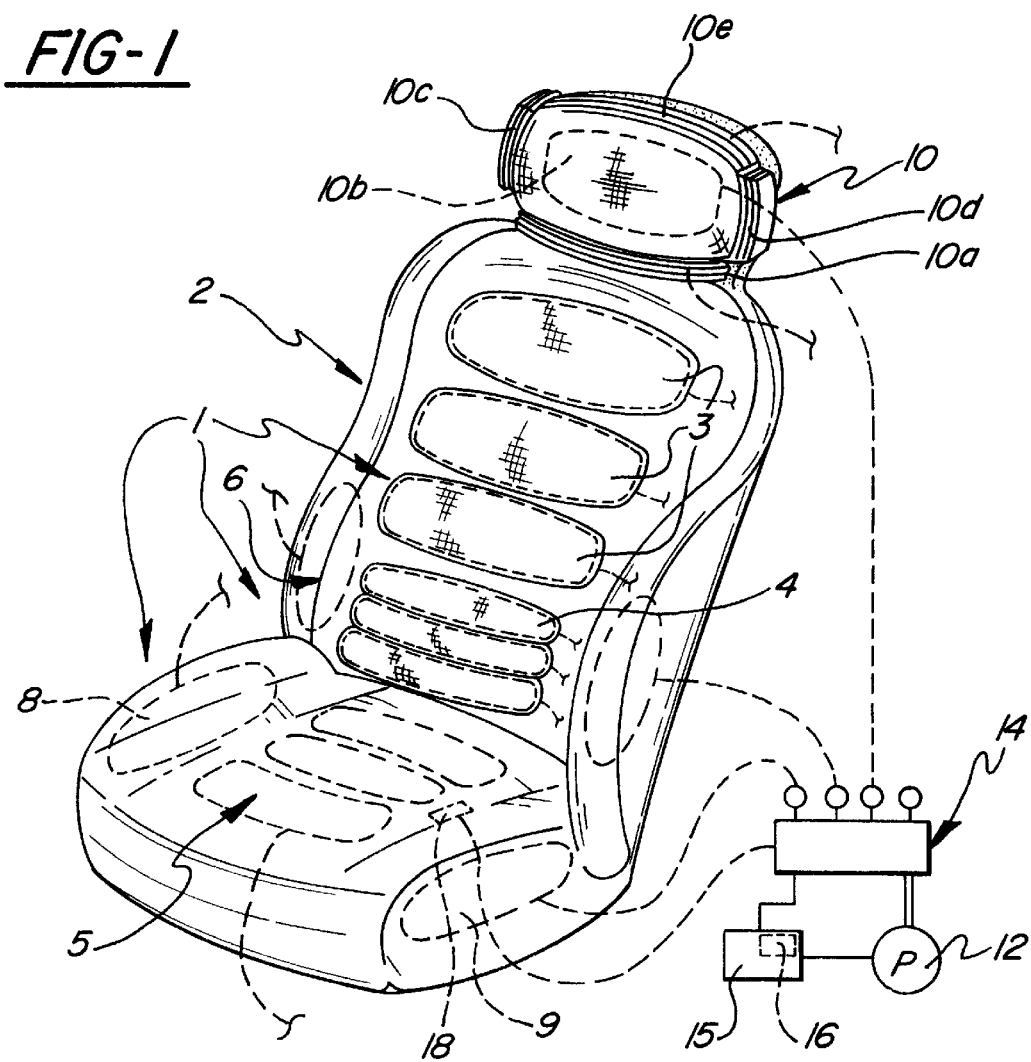
FIG. 1 is a perspective view of an automotive seat showing one embodiment of the invention for locating energy absorbing air cells in the seat back and head rest positions of a vehicle seat structure.

A series of air cells or bladders 1 are placed at strategic locations about the contour of an automotive seat 2 as shown in FIG. 1. The air cell placement is selected to coincide with key pressure points on the back, seat and head of an occupant of the seat back.

In particular, a plurality of cells 3 are positioned in the thoracic region while three cells 4 are combined in the lumbar region. Cells 5 are provided in the seat. To further facilitate the adjustability of the seat, pairs of cells, 6, 7, 8 and 9 are positioned at either side of the back and seat as well as the front and back of the thighs respectively. Each of these cells is in direct contact with the body to provide the control system with information that may be related to the comfort of the user.

In addition to the pairs of cells that are provided to adjust the comfort of a user, in accordance with the present invention a plurality of cells 10 are formed from the lumbar region to the top of the seat back. The cells 10 include one or more air cells 10a–10d that form a head rest surface at the top of the seat back.

Figure 2:
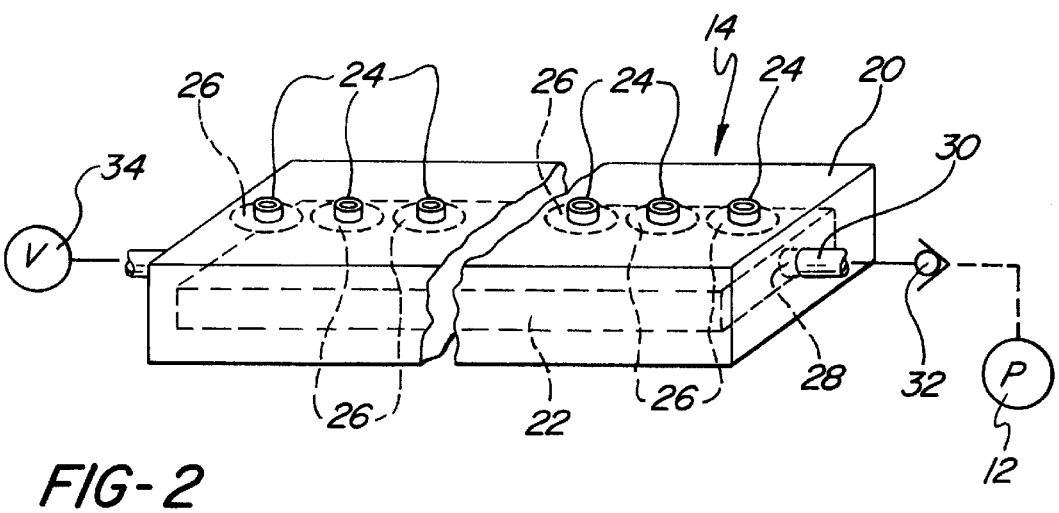
FIG. 2 is a view of a valve manifold for the embodiment of FIG. 1.

The cells are connected to a source of pressurized fluid provided in part by a pump 12 through a manifold 14 as shown in FIG. 2. The manifold 14 and pump 12 are controlled by control system 15 including a microcomputer 16 in response to information stored in the microcomputer which is compared to data provided by one or more sensors 18.

Each individual cell is constructed of a suitable flexible material such as rubber, thermoplastic urethane, polyurethane coated fabric or any other material provided with a fluid tight connection to the manifold to provide a path for conducting fluid into and out of the cell. The cells may be connected individually to the manifold or jointly with other cells. While three cells 4 are shown at the lumbar region and multiple cells 5 are shown on the seat, the invention also contemplates use of a pressurizable mat in place thereof.

The Manifold

The manifold 14 consists of a housing 20 enclosing a chamber 22 constructed with multiple outlet ports 24 for connecting the chamber 22 to the inlet/outlet tubes of each individual cell or regional group of cells. Each outlet port 24 is provided with an outlet valve 26 for controlling the flow of fluid to and from the air cells. In this embodiment, the sensor is a pressure sensing transducer 18 that is operatively connected in the manifold to sense the pressure in the manifold chamber 22 and generate a signal indicative thereof. Chamber 22 is also constructed with a single inlet port 28 which is connected to a feed tube 30 to receive pressurized fluid, in this case air, from the pump 12. Pump 12 has a pump motor 12a connected to a pump drive 12b that is operated in response to air cell pressure under the control of microcomputer 16.

A supply valve 32 is provided in feed tube 30 to control the flow of pressurized fluid to the manifold. The manifold can be molded of a high strength plastic or rubber material or other suitable material. The plastic material arrangement can have many of its components integrally molded therein. It is preferred that it be as compact and light weight as possible. However, the invention can be configured with other than light weight components and other than with integral components. A common bleed or exhaust valve 34 is provided to selectively release pressure from the manifold chamber 22 through venting port 36. The pressure in chamber 22 can therefore be adjusted by either actuating pump 12 or bleed valve 34.

Figure 3:
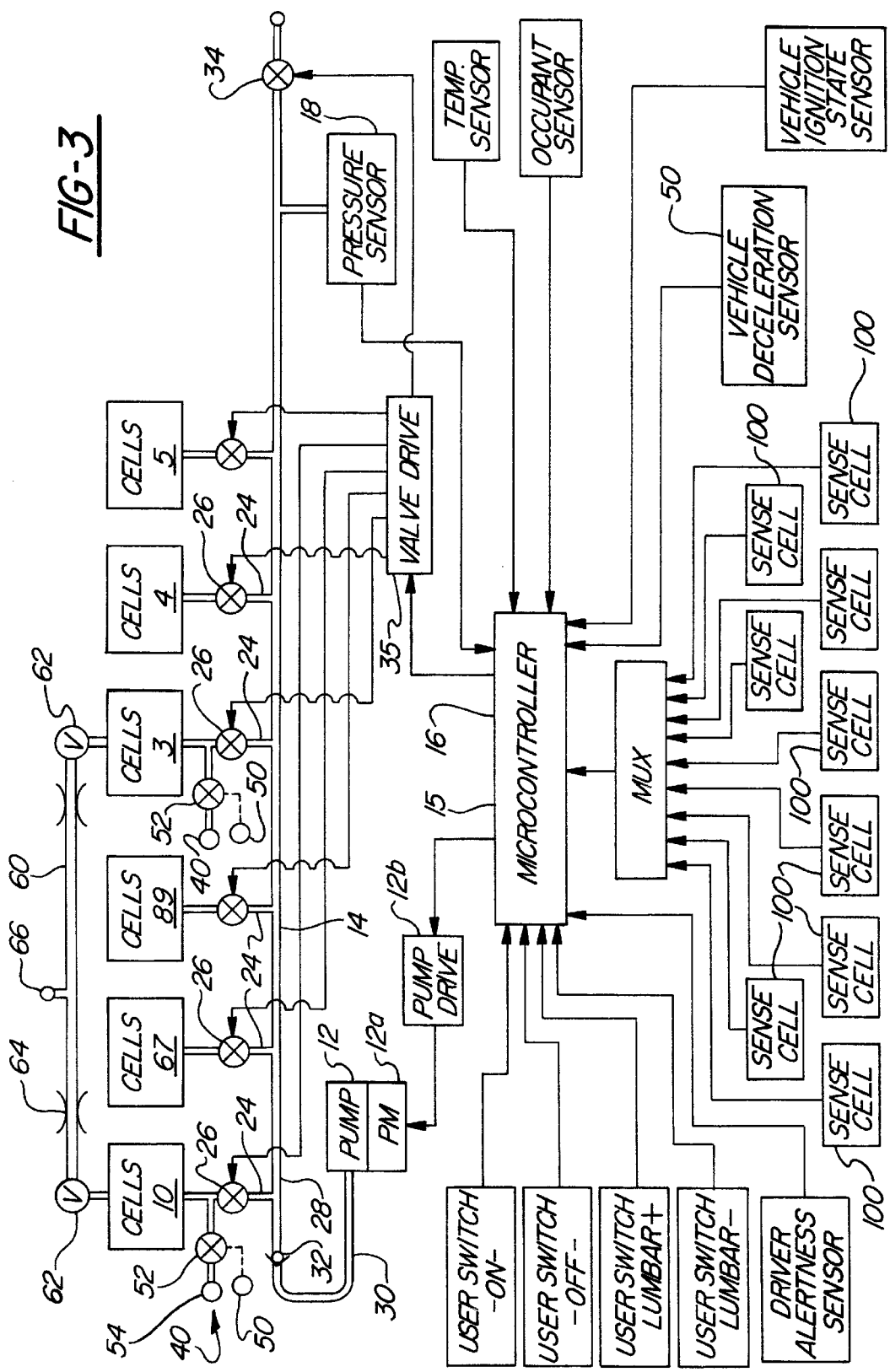
FIG. 3 is a view of a pressure supply system for the embodiment of FIG. 1.

As shown in the diagrammatic control circuit of FIG. 3, valves 26 are actuated by an electrical signal from a valve drive 35 and are designed for low power, low fluid resistance operation. More specifically, each valve 26 is an adaptation of highly efficient valves used in medical applications such as MEMS (micro electromechanical system) type or piezoelectric actuated valves. The bodies and valve seats of such designs are easily moldable with and can be integrated as light weight components within the manifold body or on a PC board. Individual valve bodies can be designed for stacking assembly to form the manifold of this invention. In addition to a piezoelectric actuated valve other low energy actuatable valves are contemplated by the present invention including but not limited to electrically pulsed reed valves; valves having an actuator configured of nickel titanium alloy such as Nitinol; magnetic inductive type valves or fluidic control valves so long as low energy consumption will operate the valve in on-off positions in which the flow from an inlet to outlet will satisfy the flow requirements of the pressure adjusted air cells in a given electropneumatic system for controlling a seating surface such as a seat, chair or bed to provide contouring, movement, support and/or comfort at a user interface. The importance of the use of such a valve arrangement in the present invention is that, in the past, pressure adjusted systems have utilized solenoid actuated valves to open and close an air cell to a pressure source for inflating the air cell or to a relief path for deflating the air cell. In such applications, the size of the control package is difficult to contain within the confines of a vehicle seat structure. Furthermore, power consumption is a problem since the major power consumers in the system combine power flow for operation of a motor driven pump and the power flow for operating the solenoids connected to the mechanical valving components. In one working embodiment, eight valves are required to control flow to ten air zones shown in the embodiment of FIG. 1 and to one exhaust.

Also, another advantage of reduced power is where power consumption is a rigid design constraint, as in the case of battery powered systems. The orders of magnitude decrease in valve power consumption provided by the present invention becomes a significant, and heretofore unrecognized advantage since a smaller power source can be used for lower cost and reduced weight; fewer modifications to wiring harness designs in vehicular operations are required and less heat is generated in systems where heat build up can be disadvantageous as for example in space shuttle and other vehicular operations where the system is used in a controlled environment.

Another feature of the valves 26 is that they have high flow rate capability that is important in applications where the air cell volume is relatively large, e.g., in the operation of the energy absorbing components of the system to be described. In such system the response is required to be non-subtle, e.g., pressure adjustments in the cell are made rapidly. In such applications the large flow rate is especially advantageous. However, in all applications, the flow rate will directly impact system energy dissipation. The activation time (time required for the system to reach a desired programmed target) will depend upon the flow rate of the valves, pump flow rate capacity, and volume of the target air cell(s). If the flow rate of an individual valve is low, more time will be required to achieve the target, a pump will be required to run for a longer period of time in which its power consumption over greater time will produce greater energy dissipation. Another disadvantage of such prior art lower flow rate valves is that they are pneumatically lossy since pressure drop across the valves will be higher and usable pressure at the outlet of the valve will be less.

The Control

The active parts of the system of this invention namely: the outlet valves 26, the pressure transducer 18, pump 12, as well as bleed valve 34 and supply valve 32 are interconnected electrically to a microcomputer unit 16 which controls the operation of the system. The microcomputer 16 can be a commercially available microcomputer such as the 68HCO5 variant manufactured by Motorola. A microcomputer as used herein includes all subsystems and peripheral components as is well known to those skilled in the art.

The microcomputer 16 has access to non-volatile memory which has been programmed to provide a predetermined comfort standard such as the algorithm described in U.S. Pat. No. 5,283,735. These data can be compiled and coded for use with individual air cells or regions of air cells. Data sensed by transducer 18 is compared to the comfort standard and an actuation signal is generated which actuates the system to compensate for any differential between the programmed comfort level and the sensor generated data.

In order to operate each cell or group of cells independently to provide an extensively adjustable system, the microcomputer 16 must also be programmed to actuate the output valves 26 to isolate a selected air cell or group of air cells in communication with the manifold. The actuation is controlled in closed loop fashion to allow the pressure in the chamber 22 to equalize with the pressure in the air cell or cells with which it is communicating. On an instantaneous basis there is a closed system among the connected air cell(s), the feed tube 28, the chamber 22, and the fluid supply thereby allowing the sensor to provide data from the closed system and to provide adjustment of the pressure in the isolated air cell(s) by the microcomputer 16 to the desired comfort or pressure level.

Operation

Figure 6:
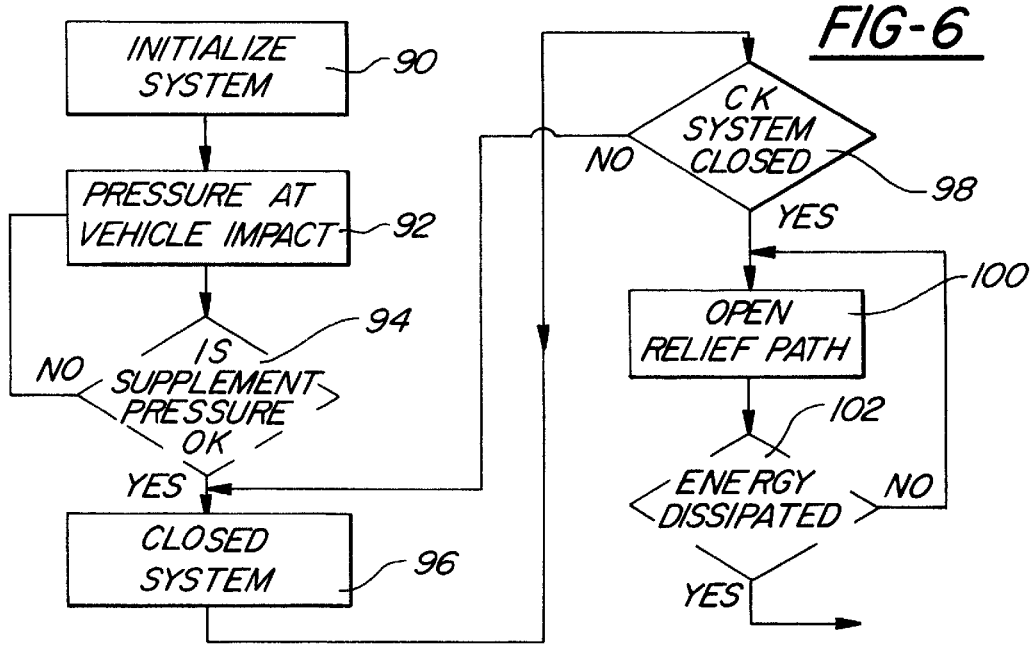
FIG. 6 is a block diagram of the method for controlling the fluid distribution systems of the present invention.

The operation of the invention will be understood to have application to either the embodiment of FIG. 3 or the embodiments shown in FIG. 6 and in FIG. 7 of U.S. Pat. Ser. No. 8/808,511 commonly owned by the assignee of the captioned invention and incorporated herein by reference. It should be understood that the operation of the target pressure control variants to be described herein apply equally well to systems in which the air cells can be independently positioned or remain in a predetermined position on a support surface of a vehicle seat or the like.

In operation, the microcomputer 16 will condition the valve drive 35 to in turn open a valve 26 interconnecting a selected air cell or air cell group, such as one or more of the back head rest cells 10, with the manifold chamber 22 and allow the pressure in the selected system to settle out. The time to let pressure equalize is "pressure settling time". After the settling time, the pressure is sensed and a signal is sent to the microcomputer 16 for comparison with the preprogrammed comfort data. The microcomputer 16 then generates a signal relative to the difference in the comfort level sensed to the programmed comfort level and initiates a flow of fluid to or from the selected cell system to reduce the difference to zero. This sequence of operations is then repeated "n" times until each of the air cell systems are sensed and adjusted.

Energy Absorbing Air Cells

The device and method of this invention may be simplified by using a preset pressure as the programmed comfort level and allowing the system to poll each air cell system and adjust the pressure in each air cell to the preset pressure. In addition the operator could be allowed to adjust the pressure level in accordance with his or her own perceived comfort. Also the instantaneous data may be sensed by an array of force sensors as described in U.S. Pat. No. 5,283,735 in the place of the transducer 18. In the latter instance the sequencing would remain the same, but it would be coordinated with a polling of the sensor array. It is observed that by varying the comparative comfort data and the number and location of the air cells, the system of this invention allows for a wide variety of comfort styles and an almost infinite flexibility of adjustment in a package that is simple, light weight, low cost and efficient.

While such control is advantageous for controlling most of the air cells in the seat structure, in accordance with the present invention it would also be desirable to operate certain of the cells so as to serve as energy absorbing units within the seat structure when the vehicle crashes causing the occupant to impact against the seat back air cells 3 and/or the head rest air cells 10.

Additionally, in accordance with the present invention, air cells forming the contouring elements of the seat back (cells 3) and a head rest surface (cells 10) have their pressure controlled in response to vehicle impact so as to protect the occupant on rebound against hard components of a seat back and head rest structure during or following vehicle impact.

In order to accomplish this objective in the present invention the air cells 3 are configured and located in the vertical seat back so as to define a pneumatically controlled back seat surface for a vehicle having an array of air cells, each connected to a source of pressurized fluid (air), and arranged in a manner to inflate in response to vehicle impact so as to provide a pressurized air cell or air cells in the seat that will cushion and thereby provide head and back impact protection. More particularly, the source of air can be the comfort pressure control system described above or alternatively, as shown in FIG. 3 the air cells 3 or 10 can be connected to a rapid response high pressure source 40 that will inject a charge of air into each of the air cells, more particularly, in response to a signal from a vehicle impact sensor 50, a valve 52 opens to a high pressure fluid in a canister 54 for supplying pressurized fluid to the air cells 3, 10. Hence, as the vehicle crashes the air cells will be filled with gaseous fluid that will compress upon contact with a seat occupant produced by the vehicle crash. Such rapid pressure change can be accomplished with valve(s) 26 closed.

Thus, in one aspect of the invention either prior inflated air cells 10 in the seat back or head rest of a vehicle seat or air cells either as inflated, or inflated in response to vehicle impact, are controlled to serve as cushions for controlling back or head contact with the air cells in the seat back or head rest as a result of vehicle impact induced movements of a seat occupant. One embodiment of such an inflated head rest air cells cushion is shown in FIG. 4 wherein the head of the occupant propelled rearwardly into a cushioned surface 55 of a head rest 10 of the seat back is protected by an air cushion.

In the illustrated embodiment of the invention the head rest 10 includes a air cell 10*a* with pleated walls that will adjust the head rest 10 vertically upon changes in pressure therein. The head rest further includes a head rest air cell 10*b* having side air cells 10*c* and 10*d* with pleated walls to extend on either side of the users head for protecting the sides thereof. The head rest 10 can be adjusted fore and aft by an inflatable air cell 10*e*.

If additional energy absorption is desired, air contained within the air cells 3, 10 of the seat back and head rest structure can be connected to an exhaust system that is operative immediately when a target impact protection pressure is present in the air cells 3, 10 and following a vehicle crash. In such case, an impact protection system 60 as shown in FIG. 3 is provided in conjunction with one or more of the air cells 3, 10 in a seat back or head rest. Once the air cells 3, 10 are fully or in part inflated to a desired impact protection pressure level in response to vehicle impact, the protection system 60 simultaneously connects to one or more of the air cells 10 via valves 62 that, upon attainment of a target pressure, can be connected through an exhaust pipe 66 via exhaust orifices 64 for dissipating energy. The valves 62 can be opened by the valve drive 35 when a vehicle impact is detected by the vehicle impact sensor 50 of a magnitude, for example, that will deploy an air bag restraint system. Upon such impact, a secondary contact of an occupant with one or more of the air cells 10 will force air flow through the exhaust orifice 64 so as to dissipate energy/absorb energy of occupant contact with air cells within the seat back and or head rest of the vehicle seat.

Figure 4:
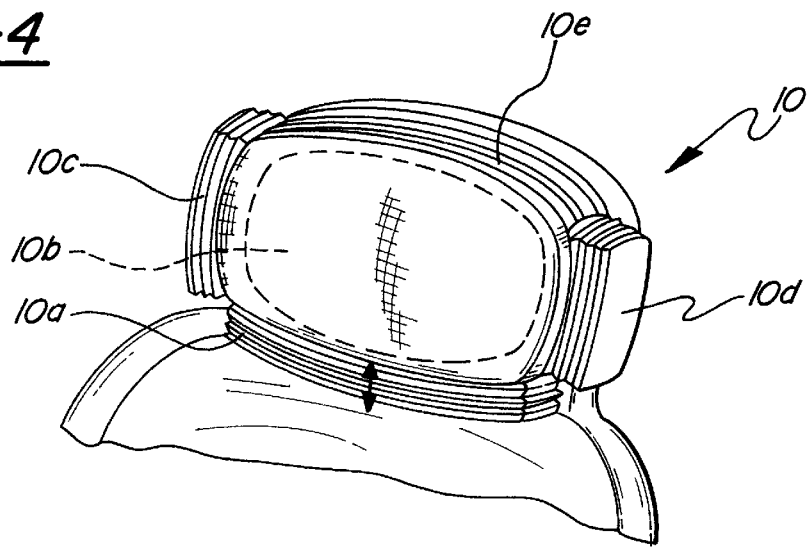
FIG. 4 is a diagrammatic view of a head rest embodiment including air cells for adjusting vertical height, fore and aft disposition and the position of an air cell cushion for absorbing head impact.

As shown in the embodiment of FIG. 4, the head rest air cells include an air cell 10*a* that will be pressurized to control the height of the head rest under the control of the microprocessor upon initial occupant sensing. Once the air cell 10*a* is properly inflated to adjust the vertical location of the head rest air cells behind the head of a particular occupant. The pneumatically controlled head rest 10 is illustratively shown as having one or more air cells 10*b*, 10*c*, 10*d* of an inflation system which can adjust the pressure in each of the cells simultaneously or sequentially, as desired, in accordance with sensed vehicle impact so that the head rest air cells are operatively controlled to individually inflate to a desired pressure level upon vehicle impact or crash to define a head support cushion within a vehicle seat that will be configured for protecting and cushioning the head of a wide range of occupant heights upon contact with the head rest. For example, in the embodiment of FIG. 1, the head rest air cells 10*c*, 10*d* are arranged on either side of the cushion air cell 10*b*; if additional energy absorption is desired, all the air cells 10*b*–10*d* can be connected to the energy dissipating exhaust orifice 64. If even further energy absorption is desired the air cell 10*e* for adjusting the headrest fore and aft can be connected to a energy dissipating exhaust orifice 64.

Figure 5:
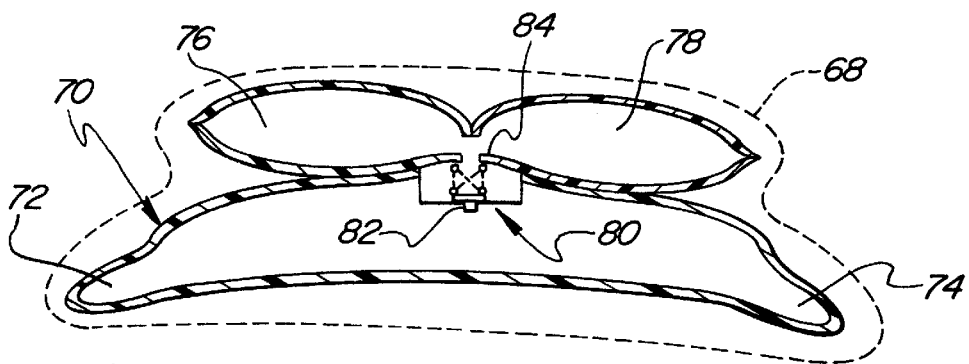
FIG. 5 is a diagrammatic view of an orifice controlled air cell for dissipating energy upon occupant impact therewith.

Another embodiment of a light weight, low cost seat head rest air cell array, includes a head rest air cell 70 shown in horizontal section in FIG. 5 within a head rest illustratively shown in outline at 68. Air cell 70 can be made part of the uppermost segment of a standardized seat back that will conform to the height of a wide range of standard occupants. The air cell 70 in such case can be inflated to a desired impact protection pressure level determined by the microcomputer 16 and can be configured to provide a cushioning effect by having extended wing segments 72, 74 and back mounted cells 76, 78 that will capture and cushion the occupant's head upon contact with the seat back following vehicle impact.

In the embodiment of FIG. 5, the impact control system for such pneumatically controlled energy absorbing seat back or head rest air cells 70 can be a single pressure relief valve 80 to dissipate pressure upon head impact from the air cell 70. In this case, the air cell 70, 76, 78 are pressurized to predetermined post crash pressure level so as to provide secondary impact pressure changes in response to occupant movement against the seat back or head rest air cells and pressure relief and energy dissipation is produced by an orifice 82 in the valve 80. The orifice is normally closed by a spring biased closure 84.

In the embodiment of FIG. 1, the microcomputer 16 is programmed to operate multiple valves 26 and a pump 12 to conduct an initial inflate of the system cells to a gross pressure level with all of the valves initially open followed by continuous pressure reads and a sequential closure of each pressure zone formed by one or more cells as the pressure therein is compared by operation of the microcomputer to a desired target pressure. In addition, the impact sensor 50 can condition the computer 16 to operate the same components to provide a secondary adjustment of the desired target pressure as an impact protection target pressure in responsive to a vehicle impact signal.

Thus in the embodiment of FIG. 1, a microcomputer control of the preceding object the microcomputer 16 can sequentially control the pressure level in each cell of the seat including the pressure in the seat back and head rest air cells 3, 10 by a pressure pump inflation or by an exhaust valve deflation. Alternatively, the seat back and head rest air cells alone can be raised to a elevated supplemental impact protection target pressure range by a supplemental pressure source such as shown at 40. An orifice controlled dissipation of energy from the seat back and seat head rest air cells 10 can occur through the orifice 64 of the FIG. 3 embodiment or through pressure relief valve(s) 80.

As shown in the block diagram of FIG. 6, the system is initialized (90) to open all the cells to atmosphere when a seat is not occupied. If no further automatic or manual control adjustment occurs, cells 3, 10 are pressurized (92) in response to vehicle impact. The system operates to inflate (94) the seat back and head rest air cells of the system to an impact pressure control level in response to vehicle impact. Once attained, supplemental impact pressure system valves 26 are closed (96). Check to see if system is closed (98). If yes, open relief path (100). Check energy dissipation, if yes return to (90).

If desired, the system can be initialized by having the microcomputer perform an initial occupant assessment in response to pressure signals provided by sensor cells 100 (FIG. 3). When such assessment is made and inputted to the microcomputer 16, thereafter it is utilized to establish the energy absorption target pressures for the seat back air cells and the head rest air cells in a look-up table for use in the impact control operation of the system according to the method of FIG. 6.

Also, the impact protection control method can include the process following initial occupant assessment made and inputted to the microcomputer to provide pressure adjustment of the vertical positioning air cell 10b of the head rest air cell array. If the vertical position is properly sensed for the occupant seated in the vehicle seat, the air cell 10b will thereafter be maintained against further adjustment and utilized to establish the positions of air cells in a head rest of the system prior to and following vehicle impact.

If desired, the method can further provide, upon occupant assessment for a selective pressurization of head rest air cell 10e to provide fore and aft adjustment of an inflatable energy absorbing air cells 10b–d that will cushion and/or be associated with a bleed orifice system in response to vehicle impact and upon contact of an occupant's head with the energy absorbing air cell.

While the best modes for carrying out the invention have been described herein in detail, those familiar with the art to which this invention pertains will recognize various alternative designs and embodiments for practicing the invention are possible within the scope of the following claims.

What is claimed is:

1. An apparatus for adjusting the contour of a seat by pneumatically controlling the comfort of the seat, said apparatus comprises:
   a. a plurality of inflatable air cells mounted in operative association with a seat contour;
   b. a fluid distribution system providing independent passages connected to each of the air cells;
   c. a manifold connected to each of the passages of the distribution system through an individual output valve actuated by a first electrical signal;
   d. a source of pressurized fluid activated by a second electrical signal and connected to the fluid distribution system through the manifold;
   e. one or more pressure transducer(s) for sensing a pressure within said air cells when each of said individual output valves is actuated so as to communicate each of said air cells with said manifold; said one or more pressure transducer(s) generating a pressure signal indicating the pressure within each of the air cells; and
   f. a microcomputer including an analog to digital converter; said microcomputer connected to transmit an actuation signal to each of the manifold valves; to receive the signal from said one or more pressure transducer(s) via said analog to digital converter and to transmit an activation signal to the source of pressurized fluid in accordance with the signal from said pressure transducer; said microcomputer being programmed to store predetermined comfort data relative to comfort including a desired pressure to be maintained in each of said air cells; to transmit actuation signals to each of the manifold valves; to compare said force signal to the predetermined comfort data; to generate a valve activation signal relative to the comparison between said pressure signal and said comfort data and further programmed to transmit said activation signal to the source of pressurized fluid to adjust the pressure in each of the air cells to a desired pressure in each of said air cells, wherein the improvement comprises:

a seat back;
a predetermined set of said plurality of inflatable air cells located on said seat back and configured as a pneumatically controlled back seat surface;
a vehicle impact sensor operative in response to a vehicle crash; said microcomputer configured to receive the signal from said vehicle impact sensor upon a vehicle crash via said analog to digital converter and to transmit an activation signal to the source of pressurized fluid in accordance with the signal from said impact sensor to produce an impact protection target pressure within said predetermined set of said plurality of inflatable air cells so as to provide a pressurized air cell or air cells on said seat back that will cushion and thereby provide occupant impact protection when a vehicle crashes so as to cause a seat occupant to be moved in a direction to impact against said seat back.

2. In the apparatus of claim 1, said predetermined set of said plurality of inflatable air cells configured as cushions on said seat back for controlling seat back contact as a result of vehicle crash induced movements of a seat occupant.

3. In the apparatus of claim 1, said predetermined set of said plurality of inflatable air cells therein fully or in part inflated in response to vehicle impact and wherein one or more of said plurality of inflatable air cells is simultaneously connected through an exhaust orifice; said output from said micro controller operative in response to a vehicle impact that will deploy an air bag system and wherein air flow through said exhaust orifice dissipates energy/absorb energy of occupant contact with one or more of said plurality of inflatable air cells.

4. In the apparatus of claim 1, wherein one or more of said predetermined set of said plurality of inflatable air cells forming a pneumatically controlled head rest operatively connected to a bleed orifice for controlling the release of air so as to dissipate energy/absorb energy.

5. In the apparatus of claim 1, wherein one or more of said predetermined set of said plurality of inflatable air cells forming a pneumatically controlled head rest including a first air cell for adjusting the height of said head rest; a second air cell configured to serve as a cushion for head impact and at least a third air cell for controlling fore and aft adjustment of said head rest.

6. In the apparatus of claim 1, wherein a vehicle impact sensor and said microcomputer programmed to automatically fill said predetermined set of said plurality of inflatable air cells to a predetermined post crash pressure level so as to provide secondary impact pressure protection.

7. In the apparatus of claim 6, wherein a sensor and microcomputer operative in response to multiple input signals from the group consisting of an occupant detection condition; a temperature condition; system power-up; on-off switch and a system override switch.

8. In the apparatus of claim 1, wherein said microcomputer control of including sequential control of each air cell of said predetermined set of said plurality of inflatable air cells to produce a pump inflation of each air cell; an exhaust valve deflation of each of said air cells or by an orifice controlled dissipation of energy from each of said air cells.

9. In the apparatus of claim 1, wherein said microcomputer and transducers including at least said pressure transducer operative to condition said valves to open all of said air cells including said predetermined set of said plurality of inflatable air cells to atmosphere when a seat is not occupied and to inflate said seat back and head rest air cells of the system to an impact pressure control level in response to vehicle impact.

10. In the apparatus of claim 1, wherein said microcomputer and transducers including at least said pressure transducer operative to provide an initial occupant assessment that is inputted to the microcomputer and utilized to establish energy absorption target pressures for the said predetermined set of said plurality of inflatable air cells seat back air cells and the head rest air cells in a look-up table for use in the comfort control operation of the system.

11. In the apparatus of claim 10, wherein said predetermined set of said plurality of inflatable air cells in a head rest of a vehicle seat having fore and aft adjustment of an inflatable energy absorbing air cell that will cushion and/or provide a bleed orifice flow for energy dissipation in response to vehicle impact and upon contact of an occupant's head with the head rest.

12. An apparatus for adjusting the contour of a seat by pneumatically controlling the comfort of the seat, said apparatus comprises:
 a. a plurality of inflatable air cells mounted in operative association with a seat contour;
 b. a fluid distribution system providing independent passages connected to each of the air cells;
 c. a manifold connected to each of the passages of the distribution system through an individual output valve actuated by a first electrical signal;
 d. a source of pressurized fluid activated by a second electrical signal and connected to the fluid distribution system through the manifold;
 e. one or more pressure transducer(s) for sensing a pressure within said air cells when each of said individual output valves is actuated so as to communicate each of said air cells with said manifold; said one or more pressure transducer(s) generating a pressure signal indicating the pressure within each of the air cells; and
 f. a microcomputer including an analog to digital converter; said microcomputer connected to transmit an actuation signal to each of the manifold valves; to receive the signal from said one or more pressure transducer(s) via said analog to digital converter and to transmit an activation signal to the source of pressurized fluid in accordance with the signal from said pressure transducer; said microcomputer being programmed to store predetermined comfort data relative to comfort including a desired pressure to be maintained in each of said air cells; to transmit actuation signals to each of the manifold valves; to compare said force signal to the predetermined comfort data; to generate a valve activation signal relative to the comparison between said pressure signal and said comfort data and further programmed to transmit said activation signal to the source of pressurized fluid to adjust the pressure in each of the air cells to a desired pressure in each of said air cells, wherein the improvement comprises:
 a seat back;
 a predetermined set of said plurality of inflatable air cells located on said seat back and configured as a pneumatically controlled back seat surface;
 a vehicle impact sensor operative in response to a vehicle crash; said microcomputer configured to receive the signal from said vehicle impact sensor upon a vehicle crash via said analog to digital converter and to transmit an activation signal to the source of pressurized fluid in accordance with the signal from said impact sensor to produce an impact protection target pressure within said predetermined set of said plurality of inflatable air cells so as to provide a pressurized air cell or air cells on said seat back that will cushion and thereby provide occupant impact protection when a vehicle crashes so as to cause a seat occupant to be moved in a direction to impact against said seat back;
 said predetermined set of said plurality of inflatable air cells having one or more air cells forming a pneumatically controlled head rest; and said microcomputer operative to control said source of pressurized fluid to adjust the pressure in said one or more air cells simultaneously or sequentially, as desired, in accordance with sensed vehicle impact so that the head rest air cells are operatively controlled to individually inflate to a desired pressure level upon vehicle impact to define a head support cushion within a vehicle seat that will be configured for protecting and cushioning the head of a wide range of occupant heights upon contact with the head rest, whereby one or more of said predetermined set of said plurality of inflatable air cells forming a pneumatically controlled head rest operatively connected to a bleed orifice for controlling the release of air so as to dissipate energy and absorb energy.

13. An apparatus for adjusting the contour of a seat by pneumatically controlling the comfort of the seat, said apparatus comprises:
 a. a plurality of inflatable air cells mounted in operative association with a scat contour;
 b. a fluid distribution system providing independent passages connected to each of the air cells;
 c. a manifold connected to each of the passages of the distribution system through an individual output valve actuated by a first electrical signal;
 d. a source of pressurized fluid activated by a second electrical signal and connected to the fluid distribution system through the manifold;
 e. one or more pressure transducer(s) for sensing a pressure within said air cells when each of said individual output valves is actuated so as to communicate each of said air cells with said manifold; said one or more pressure transducer(s) generating a pressure signal indicating the pressure within each of the air cells; and
 f. a microcomputer including an analog to digital converter; said microcomputer connected to transmit an actuation signal to each of the manifold valves; to receive the signal from said one or more pressure transducer(s) via said analog to digital converter and to transmit an activation signal to the source of pressurized fluid in accordance with the signal from said pressure transducer; said microcomputer being programmed to store predetermined comfort data relative to comfort including a desired pressure to be maintained in each of said air cells; to transmit actuation signals to each of the manifold valves; to compare said force signal to the predetermined comfort data; to generate a valve activation signal relative to the comparison between said pressure signal and said comfort data and further programmed to transmit said activation signal to the source of pressurized fluid to adjust the pressure in each of the air cells to a desired pressure in each of said air cells, wherein the improvement comprises:
 a seat back;
 a predetermined set of said plurality of inflatable air cells located on said seat back and configured as a pneumatically controlled back seat surface;

a vehicle impact sensor operative in response to a vehicle crash; said microcomputer configured to receive the signal from said vehicle impact sensor upon a vehicle crash via said analog to digital converter and to transmit an activation signal to the source of pressurized fluid in accordance with the signal from said impact sensor to produce an impact protection target pressure within said predetermined set of said plurality of inflatable air cells so as to provide a pressurized air cell or air cells on said seat back that will cushion and thereby provide occupant impact protection when a vehicle crashes so as to cause a seat occupant to be moved in a direction to impact against said seat back;

said microcomputer programmed to operate multiple valves and a pump to conduct an initial inflate of the said predetermined set of said plurality of inflatable air cells to a gross pressure level with all of the valves initially open followed by continuous pressure reads and a sequential closure of each pressure zone formed by at least one of the cells as the pressure therein is compared by operation of the microcomputer to a desired target pressure and to provide a secondary adjustment of the desired target pressure in responsive to a vehicle impact signal.

14. An apparatus for adjusting the contour of a seat by pneumatically controlling the comfort of the seat, said apparatus comprises:
   a. a plurality of inflatable air cells mounted in operative association with a seat contour;
   b. a fluid distribution system providing independent passages connected to each of the air cells;
   c. a manifold connected to each of the passages of the distribution system through an individual output valve actuated by a first electrical signal;
   d. a source of pressurized fluid activated by a second electrical signal and connected to the fluid distribution system through the manifold;
   e. one or more pressure transducer(s) for sensing a pressure within said air cells when each of said individual output valves is actuated so as to communicate each of said air cells with said manifold; said one or more pressure transducer(s) generating a pressure signal indicating the pressure within each of the air cells; and
   f. a microcomputer including an analog to digital converter; said microcomputer connected to transmit an actuation signal to each of the manifold valves; to receive the signal from said one or more pressure transducer(s) via said analog to digital converter and to transmit an activation signal to the source of pressurized fluid in accordance with the signal from said pressure transducer; said microcomputer being programmed to store predetermined comfort data relative to comfort including a desired pressure to be maintained in each of said air cells; to transmit actuation signals to each of the manifold valves; to compare said force signal to the predetermined comfort data; to generate a valve activation signal relative to the comparison between said pressure signal and said comfort data and further programmed to transmit said activation signal to the source of pressurized fluid to adjust the pressure in each of the air cells to a desired pressure in each of said air cells, wherein the improvement comprises:
   a seat back;
   a predetermined set of said plurality of inflatable air cells located on said seat back and configured as a pneumatically controlled back seat surface;
   a vehicle impact sensor operative in response to a vehicle crash; said microcomputer configured to receive the signal from said vehicle impact sensor upon a vehicle crash via said analog to digital converter and to transmit an activation signal to the source of pressurized fluid in accordance with the signal from said impact sensor to produce an impact protection target pressure within said predetermined set of said plurality of inflatable air cells so as to provide a pressurized air cell or air cells on said seat back that will cushion and thereby provide occupant impact protection when a vehicle crashes so as to cause a seat occupant to be moved in a direction to impact against said seat back;
   said initial occupant assessment utilized to establish the positions of said predetermined set of said plurality of inflatable air cells having one or more air cells forming a pneumatically controlled head rest prior to and following vehicle impact.

* * * * *